United States Patent
Nakayama

Patent Number: 5,928,730
Date of Patent: Jul. 27, 1999

[54] PROCESSING FOR FORMING CURED PAINT FILM

[75] Inventor: Yasuharu Nakayama, Kanagawa, Japan

[73] Assignee: Kansai Paint Co., Ltd., Amagasaki, Japan

[21] Appl. No.: 08/976,455

[22] Filed: Nov. 25, 1997

Related U.S. Application Data

[63] Continuation of application No. 08/570,566, Dec. 11, 1995., abandoned

[30] Foreign Application Priority Data

| Dec. 9, 1994 | [JP] | Japan | 6-335180 |
| Jul. 25, 1995 | [JP] | Japan | 7-218010 |
| Jul. 31, 1995 | [JP] | Japan | 7-224440 |

[51] Int. Cl.$^6$ .................................................. B05D 1/36
[52] U.S. Cl. ................. 427/457; 427/595; 427/340; 427/421; 427/435; 427/440; 204/471; 204/492; 204/493; 204/494; 204/498; 204/499; 204/501; 204/502; 204/504; 204/507; 204/509
[58] Field of Search ................ 427/430.1, 421, 427/435, 440, 337, 340, 457, 595; 204/471, 492, 493, 494, 498, 499, 501, 502, 504, 507, 509

[56] References Cited

U.S. PATENT DOCUMENTS

| 4,176,103 | 11/1979 | Cruden et al. | 428/522 |
| 4,933,213 | 6/1990 | Fourquier et al. | 427/302 |
| 5,432,229 | 7/1995 | Aoki et al. | 524/820 |

FOREIGN PATENT DOCUMENTS

| 106635 | 4/1984 | European Pat. Off. . |
| 0383002 | 1/1990 | European Pat. Off. . |
| 0618238 | 3/1993 | European Pat. Off. . |
| 0648794 | 10/1994 | European Pat. Off. . |
| 6272742 | 4/1987 | Japan . |
| 5098071 | 4/1993 | Japan . |
| 5148406 | 6/1993 | Japan . |
| 5339542 | 12/1993 | Japan . |

*Primary Examiner*—Erma Cameron
*Attorney, Agent, or Firm*—Foley & Lardner

[57] ABSTRACT

A process for forming a cured paint film from a paint containing, as a binder, a resin containing a carbonyl group, or a resin, or a resin mixture containing a carbonyl group and a carboxyl group or a paint containing, as a binder, a resin containing a resin or a resin mixture containing a group which forms a carboxyl group in the subsequent contact step with a hydrazine compound or polyhydrazide compound. The uncured paint film, which contains a carbonyl group, or a carbonyl group and a carboxyl group or a group that forms a carboxyl group, is subjected to a step of curing the paint film by allowing the uncured paint film to contact with a hydrazine compound or a polyhydrazide compound.

18 Claims, No Drawings

PROCESSING FOR FORMING CURED PAINT FILM

This application is a continuation of application Ser. No. 08/570,566, filed Dec. 11, 1995 now abandoned.

BACKGROUND OF THE INVENTION

The present invention relates to a novel process for forming a paint film, wherein a paint film is cured by allowing it to come into contact with a cross-linking agent.

Paint films using a thermoplastic resin are either soft and sticky at a high temperature or hard and brittle at a low temperature. Hence, paint films maintaining good physical properties from high to low temperatures should be cross-linked paint films.

However, heating to a high temperature is generally required for a thermal cross-linking reaction. Therein, enormous quantity of heat is required when the material to be coated has a large heat capacity; in many case, only 1% or so of the applied heat is used for the cross-linking reaction of the paint film itself. A cross-linking reaction at room temperature is desirable for effective use of the energy; however, such reaction is slow in general and does not proceed sufficiently.

A technique to make a cross-linking at room temperature proceed quickly will in general deteriorate the storage stability; thereby, pot life of the paint after the production is made short. In addition, the leveling period of the coated paint film is short, and the surface of the paint film turns coarse. In particular, this disadvantage is noticeable for the case of water-based paint and powder coating which do not use an organic solvent dissolving the resin. For the purpose of improving this defect, two package coatings are used; however, such coatings should be completed in a short period of time after the blending preparation of the paints to avoid an increase of the paint viscosity and gelation, which make the paint unusable.

In order to overcome these problems, forming a paint film, at first, that does not include cross-linking reactions and allowing enough leveling followed by curing by the contact of the paint film with a cross-linking agent will be satisfactory. Up to now, however, no process has been found that can form a practical cured paint film by combining a paint film with a cross-linking agent.

SUMMARY OF THE INVENTION

Under such situations, the present inventors have intensively researched to find a process in which a paint having a long pot life is usable, and a practical cured paint film having excellent smoothness of the coated surface, resistance to solvents which can be formed at room temperature or at a temperature up to 100° C. for forced drying. As a result, the present invention has been completed. The present invention provides a process for forming a cured paint film characterized in that a paint having a binder mentioned below is coated on to a material to be coated to form an uncured film and the uncured paint film is subjected to a step of curing the paint film by allowing the uncured paint film to come into contact with a hydrazine compound or a polyhydrazide compound. The binder mentioned above is: a resin containing a carbonyl group, or a resin or resin mixture containing a carbonyl group and a carboxyl group, or a resin or resin mixture containing a carbonyl group and a group that forms a carboxyl group.

The present invention relates to a process for forming a cured paint film characterized by that a paint (A) containing, as a binder, a resin (a) containing a carbonyl group, or a resin or a resin mixture (b) containing a carbonyl group and a carboxyl group; or a paint (B) containing, as a binder, a resin containing a resin or a resin mixture containing a carbonyl group and a group which forms a carboxyl group in the subsequent contact step with a hydrazine compound or polyhydrazide compound; is subjected to a step (C) of forming the paint into an uncured paint film, which contains a carbonyl group, or a carbonyl group and a carboxyl group or a group forming a carboxyl group, by coating (A) or (B) on to a material to be coated; and thereafter, the uncured paint film is subjected to a step (D) of curing the paint film by allowing the uncured paint film to come into contact with a hydrazine compound or a polyhydrazide compound.

DETAILED DESCRIPTION OF THE INVENTION

The paint in the present invention uses a binder which is a resin containing a carbonyl group or a resin or resin mixture containing a carbonyl group and a carboxyl group or a group that forms a carboxyl group in one molecule or in the resin mixture. Examples of the binder include the following resins or resin mixtures. (1) Resins containing a carbonyl group; (2) Resins containing a carbonyl group and a carboxyl group in one molecule of the resin; (3) Resin mixtures of a resin containing a carbonyl group and a resin containing a carboxyl group; (4) Resins containing, in one molecule, a carbonyl group and a group that forms a carboxyl group; (5) Resin mixtures of a resin containing a carbonyl group and a resin containing a group that forms a carboxyl group; (6) Resin mixtures comprising a mixture having two or more kinds of the resins and the resin mixture mentioned above (1) through (5).

The kinds of the resin and the resin mixture mentioned above are not limited specifically, and their examples include vinyl copolymer resins, alkyd resins, polyester resins, epoxy resins, and urethane resins. Above all, vinyl copolymer resins are preferred.

Typical examples of the resins containing a carbonyl group in (1), (3) and (5) mentioned above include copolymers of a vinyl monomer that contains a carbonyl group (hereinafter, may be abbreviated as "monomer (a)") and at least one other vinyl monomer.

Representative examples of the monomer (a) mentioned above include acrolein, diacetone acrylamide, diacetone methacrylamide, formyl styrol, vinyl alkyl ketones which have 4 to 7 carbon atoms (such as vinyl methyl ketone, vinyl ethyl ketone, and vinyl butyl ketone), diacetone acrylate, diacetone methacrylate, acetonitril acrylate, β-acryloyl oxyethyl acetylacetate, δ-acryloyl oxybutyl acetylacetate, (meth)acryloyl oxyalkyl propenal (the oxyalkyl group of which has 1 to 6 carbon atoms), acetoacetoxyethyl acrylate, acetoacetoxyethyl methacrylate; esterified products of a compound having a hydroxyl group and a carbonyl group and containing carbon atoms not more than 10 (such as 4-hydroxy-2 butanone, 3-hydroxy-3-methyl-2-butanone, and 4-hydroxy-4-methyl-2-pentanone) and polymerizable unsaturated carboxylic acids (such as acrylic acid and methacrylic acid); condensation products of the hydroxyl group part of a compound having a hydroxyl group and a carbonyl group and containing carbon atoms not more than 10 with the amino group part of the acrylamide or methacrylamide; addition compounds of a compound having a hydroxyl group and a carbonyl group and containing carbon atoms not more than 10 and a polymerizable unsaturated monomer having an isocyanate group (such as m-isopropenyl-α,α- dimethyl benzyl isocyanate, isocyanate ethyl methacrylate and methacryloyl acyl isocyanate); and monomers formed by adding a monoadduct (having one isocyanate group) of a compound having a hydroxyl group and a carbonyl group and containing carbon atoms not more than 10 and a diisocyanate compound (such as tolylene diisocyanate, 4,4'-diphenyl methane diisocyanate, xylylene diisocyanate, hexamethylene diisocyanate, isophorone diisocyanate and 4,4'-methylene biscyclohexyl isocyanate) to a polymerizable unsaturated monomer having an hydroxyl group (such as 2-hydroxyethyl acrylate, 2-hydroxyethyl methacrylate, hydroxypropyl acrylate and hydroxypropyl methacrylate). These may be used alone or as a mixture of two or more kinds.

Among these examples, acrolein, diacetone acrylamide, diacetone methacrylamide, acetoacetoxyethyl acrylate, acetoacetoxyethyl methacrylate, vinyl methyl ketone, and an addition compound of a polymerizable unsaturated monomer having isocyanate groups (such as m-isopropenyl-α,α-dimethylbenzyl isocyanate, isocyanatoethyl methacrylate and methacryloylacyl isocyanate) and 4-hydroxy-2-butanone are preferred, and diacetone acrylamide is particularly preferred.

As for the above-mentioned other vinyl monomers forming copolymers with the vinyl monomers containing a carbonyl group mentioned above, any monomers may be used as long as the monomer is copolymerizable with the vinyl monomers containing a carbonyl group mentioned above. Representative examples thereof include alkyl (C1 to 30) esters or cycloalkyl (C1 to 30) esters of acrylic acid or methacrylic acid, such as methyl acrylate, ethyl acrylate, n-propyl acrylate, isopropyl acrylate, (n-, i-, t-) butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, (n-, i-, t-) butyl methacrylate, hexyl methacrylate, 2-ethylhexyl methacrylate, octyl methacrylate, decyl methacrylate, lauryl methacrylate, stearyl methacrylate and cyclohexyl methacrylate; alkoxyalkyl (C2 to 18) esters of acrylic acid or methacrylic acid, such as trimethoxybutyl acrylate, trimethoxybutyl methacrylate, methoxyethyl acrylate, methoxyethyl methacrylate, ethoxybutyl acrylate and ethoxybutyl methacrylate; hydroxyalkyl (C2 to 8) esters of acrylic acid or methacrylic acid, such as 2-hydroxyethyl acrylate, hydroxypropyl acrylate, hydroxybutyl acrylate, 2-hydroxyethyl methacrylate, hydroxypropyl methacrylate and hydroxybutyl methacrylate; vinyl esters of a fatty acid having 1 to 20 carbon atoms, such as vinyl acetate, vinyl propionate, VEOVA monomer (manufactured by Shell Chemicals, vinyl ester of branched higher fatty acid); olefins such as ethylene, propylene, butylene and pentene; dienes such as butadiene, isoprene and chloroprene; N-substitutional (meth) acrylamide monomers such as dimethyl aminopropyl acrylamide and dimethylaminopropyl methacrylamide; anionic monomers such as acrylic acid, methacrylic acid, maleic anhydride and itaconic acid; cationic monomers of N,N-dialkylaminoalkyl (meth)acrylates (the alkyl of each alkyl group may preferably have 1 to 4 carbon atoms) such as dimethylaminoethyl acrylate, dimethylaminoethyl methacrylate, diethylaminoethyl acrylate, diethylaminoethyl methacrylate, dimethylaminopropyl acrylate, dimetylaminopropyl methacrylate, diethylaminopropyl acrylate and diethylaminopropyl methacrylate; styrene, vinyltoluene, acrylamide, methacrylamide, acrylonitrile, methacrylonitrile, vinyl chloride, vinylidene chloride, N-vinylpyrrolidone, vinylpyridine, vinylpivalate, sodium sulfonate and the like.

By using a monomer containing a carboxyl group (hereinafter may be referred to as monomer (b)) as a part of the other vinyl monomers mentioned above, a resin having a carbonyl group and a carboxyl group in one molecule can be prepared as the abovementioned resin (2).

By using N,N-dialkyl aminoalkyl (meth)acrylate (hereinafter may be referred to as monomer (c)) as the other vinyl monomers mentioned above, a resin having a carbonyl group and a group that forms a carboxyl group in one molecule can be prepared as the above-mentioned resin (4). A dialkylaminoalkyloxycarbonyl group can be introduced into the resin on the basis of monomer (c), and this group is easily hydrolyzed when contacted with a hydrazine or polyhydrazide compound, preferably with a hydrazine compound converting to a carboxyl group.

Representative examples of the resin containing a carboxyl group in (3) mentioned above include copolymers of monomer (b) and the other vinyl monomers than monomer (b). As for the other vinyl monomers than the abovementioned monomer (b), the examples include monomers listed as the other vinyl monomers than the abovementioned monomer (a), excluding monomer (b).

Representative examples of the resin having a group that forms a carboxyl group in (5) mentioned above include copolymers of monomer (c) and the other vinyl monomers than monomer (c). As for the other vinyl monomers than the above-mentioned monomer (c), the examples include monomers listed as the other vinyl monomers than the above-mentioned monomer (a), excluding the monomer (c).

In the vinyl copolymer resin or resin mixture which is one of the binder component of the paint used in the present invention, the amount of the vinyl monomer containing a carbonyl group mentioned above is preferably within a range of from 0.5 to 60% by weight, more preferably from 1 to 40% by weight, much more preferably from 3 to 30% by weight, on the basis of the total amount of the monomer components forming the resin or resin mixture mentioned above, from the viewpoint of cross-linking and film performance. The cross-linking may not be sufficient if the content is less than 0.5% by weight, and the film may tend to be brittle if the content is more than 60% by weight.

In the resin or the resin mixture as the binder component of the paint used in the present invention, by means of allowing the above-mentioned resin or resin mixture to contain an anionic group such as a carboxyl group, the paint is provided with anionic property; thereby, hydrophilicity and capability of anionic electrodeposition result. By means of allowing the above-mentioned resin or resin mixture to contain a cationic group such as an N,N-dialkylaminoalkyl oxycarbonyl group which is derived from N,N-dialkylaminoalkyl (meth)acrylate, the paint is provided with cationic property; thereby, hydrophilicity and capability of cationic electrodeposition result.

The amount of the ionic monomers such as anionic monomers and cationic monomers to be used, is not more than 30% by weight, preferably not more than 20% by weight, from the viewpoint of water resistance of the film. In the case of a water-based paint, the amount of the ionic monomer is within a range of from 0.5% to 30% by weight, preferably from 1 to 20% by weight, which is a required amount for making it water-based. The paint cannot be made water-based if the amount is less than 0.5% by weight, and the water resistance of the film may be deteriorated if the amount is more than 30% by weight.

By means of using 5 to 50% by weight, on the basis of the total amount of the monomers, of alkyl (C12 to 30) esters of acrylic acid or methacrylic acid, among the other monomers mentioned above, the water resistance of the resulting film can be improved. The above-mentioned copolymers can be obtained by polymerizing by known processes, such as emulsion polymerization, solution polymerization and bulk polymerization.

As for the other resins containing a carbonyl group than the above-mentioned copolymers, the examples include various kinds of resins that contains a carbonyl group, such as epoxy resin, alkyd resin, polyester resin and urethane resin.

These resins may be obtained, for example, by adding a monoadduct (which has one isocyanate group) of a compound having a hydroxyl group and a carbonyl group and having carbon atoms not more than 10 (such as 4-hydroxy-2-butanone, 3-hydroxy-3-methyl-2-butanone and 4-hydroxy-4-methyl-2-pentanone) with a diisocyanate compound (such as tolylene diisocyanate, 4,4'-diphenylmethane diisocyanate, xylylene diisocyanate, hexamethylene diisocyanate, isophorone diisocyanate and 4,4'-methylene biscyclohexyl isocyanate) to various resins containing a hydroxyl group (such as epoxy resin, alkyd resin and urethane resin). When the various resins containing a hydroxyl group to be reacted with the above-mentioned monoadducts also have a carboxyl group, resin (2) mentioned above may be obtained, and when the various resins containing a hydroxyl group to be reacted with the above-mentioned monoadducts also have a group that forms a carboxyl group, resin (4) mentioned above may be obtained.

Examples of the resin containing a carboxyl group of the above-mentioned resin (3) include grafted products of the resin containing a carboxyl group on to an epoxy resin, addition compounds of maleic anhydride to esterified products of an unsaturated fatty acid with an epoxy resin, addition compounds of an epoxy resin to a polybasic acid, an alkyd resin or polyester resin which retains a carboxyl group, addition compounds of an anhydrous acid compound to a resin containing a hydroxyl group such as alkyd resin and polyester resin, addition compounds of maleic anhydride to an unsaturated fatty acid-modified alkyd resin, addition compounds of dimethylol propionic acid and a polyvalent isocyanate compound, and addition compounds of a urethane prepolymer containing an isocyanate group and a carboxyl compound containing a hydroxyl group.

For the above-mentioned resins or each resin of the resin mixture listed (1) through (5) as the binder in the present invention, the molecular weight is not narrowly limited, however, the number-average molecular weight is generally within a range of from 500 to 2,000,000.

The form of the paint used in the present invention may be any of a water-based paint, an organic solvent type paint and a powder paint. When a water-based paint is used, the resin may be, in addition to resins prepared by emulsion polymerization, a resin produced by the following process. That is, a resin containing an ionic group is synthesized in a hydrophilic organic solvent; then the resin is subsequently neutralized and made water-miscible. For example, a resin may be usable which is prepared by copolymerization of monomer components containing an ionic monomer in a hydrophilic organic solvent, followed by a treatment for making water-dispersible or water-soluble. When the ionic monomer is anionic, the treatment mentioned above may be made by neutralizing with a base such as ammonia, amines and alkali metals; when the ionic monomer is cationic, the treatment may be made by neutralizing or converting to a quaternary salt with an acid such as formic acid, acetic acid, propionic acid and lactic acid.

While the paint used in the present invention contains, as the binder as mentioned above, a resin containing a carbonyl group, a resin or resin mixture containing a carbonyl group and a carboxyl group or a group that forms a carboxyl group, other resins may be contained as required in the binder in an amount not more than 95% in addition to the mentioned resin or resin mixture. Examples of such other resins include an acrylic resin, vinyl resin, polyester resin, alkyd resin, epoxy resin, urethane resin, petroleum resin, cellulose derivative and rosin. Furthermore, the paint used in the present invention may be blended with various kinds of additives which are generally blended with a paint. Examples of such additives include coloring pigments, body pigments, anticorrosive pigments, antisagging agents, defoamers and surface adjusting agents.

In the method according to the present invention, after the above-mentioned paint is coated on the material to be coated, the uncured paint film on the material to be coated is subjected to contact with a hydrazine compound or polyhydrazide compound; and as a result the paint film is cured.

Representative examples of the hydrazine compound include hydrazine, hydrazine hydrate ($NH_2NH_2.H_2O$), monomethylhydrazine, and monoethylhydrazine. Among these, hydrazine and hydrazine hydrate are preferred.

Examples of the process for contacting the hydrazine compound with the uncured paint film on the material to be coated include a process in which the hydrazine compound is vaporized and the uncured film is contacted with the vapor, and a process in which a solution containing the hydrazine compound such as an aqueous solution of the hydrazine compound is contacted with the uncured film.

The above-mentioned solution containing the hydrazine compound may consist of the hydrazine compound alone, or may be an aqueous solution. The concentration of such solution is not specifically limited, however, is generally not less than 1% by weight, preferably within a range of from 5 to 90% by weight. In addition, although the aqueous solution of the hydrazine compound may consist of the hydrazine compound and water, an organic solvent and acid component may be contained therein as necessary.

When the hydrazine compound is contacted with the uncured paint film, the film is preferably formed from the paint having the binder of the resin or the resin mixture listed in (2), (3), (4) or (5), particularly in (2) and (3) mentioned above.

The polyhydrazide compound used for the above-mentioned hardening of the film has two or more hydrazino groups (—$NHNH_2$), per molecule, which bind directly to the carbon atoms of the carbonyl group.

Typical examples of the above-mentioned polyhydrazide compound include compounds which may be shown by the following general formulae (1), (2) or (3). General formula (1) is as follows:

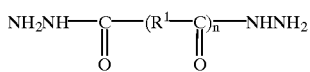

In the above formula, $R^1$ represents a divalent dicarboxyl residue having 1 through 12 carbon atoms or the direct bondage, and n represents a number of zero or one. General formula (2) is as follows:

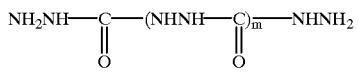

In the above formula, m represents an integer of 1 through 5, preferably 1 through 3. General formula (3) is as follows:

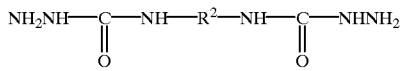

In the above formula, R² represents a divalent linear or branched alipahtic hydrocarbon group having 2 through 7 carbon atoms, a divalent cycloalipahtic hydrocarbon group or a divalent armatic hydrocarbon group each having 6 through 8 carbon atoms.

Specific examples of the above-mentioned polyhydrazide compound include compounds represented by the general formula (1) such as carbodihydrazide (dihydrazide of carbonic acid), oxalic dihydrazide, malonic dihydrazide, succinic dihydrazide, glutaric dihydrazide, adipic dihydrazide, sebasic dihydrazide, maleic dihydrazide, fumaric dihydrazide, itaconic dihydrazide, phthalic dihydrazide, isophthalic dihydrazide and terephthalic dihydrazide; compounds represented by the general formula (2), which is poly(tri, tetra, penta etc.)hydrazide of carbonic acid; bissemicarbazides represented by the general formula (3), R² of which is ethylene group, 1,2- or 1,3-propylene group, butylene group, hexylene group, o-, m- or p-phenylene group, tolylene group, cyclohexylene group or methyl cyclohexylene group; dihydrazide or trihydrazide of trimellitic acid, dihydrazide, trihydrazide or tetrahydrazide of pyromellitic acid; nitrylotriacetic trihydrazide and ethylenediamine tetraacetic tetrahydrazide; polyhydrazide formed by adding dihydrazine to polyacrylic acid, polymathacrylic acid or copolymers containing acrylic acid or methacrylic acid as a monomer component; and polyhydrazide formed by allowing a low polymer having a lower alkyl ester group of carbonic acid to react with hydrazine or hydrazine hydrate (see Japanese Laid-Open Patent No. 52-22878/1977).

Among these, dihydrazides of a carboxylic acid which has $R^1$ in the general formula (1) representing a saturated or unsaturated dicarbonic acid residue having 1 to 4 carbon atoms are preferred in view of the solubility to aqueous solvents and cross-linking reaction. Examples of the preferred compound are carbodihydrazide and oxalic dihydrazide, malonic dihydrazide, succinic dihydrazide, glutaric dihydrazide, adipic dihydrazide, maleic dihydrazide, fumaric dihydrazide and itaconic dihydrazide.

The concentration of the polyhydrazide compound in the aqueous solution containing the polyhydrazide compound is not limited in particular, however, is generally suitable within a range of from 1 to 40% by weight, preferably from 5 to 20% by weight.

Although the aqueous solution containing the above-mentioned polyhydrazide compound may consist of the polyhydrazide compound and water, an organic solvent and acid component may be contained as required.

The above-mentioned organic solvent is blended for the purpose of improving the solubility of the polyhydrazide compound in the aqueous solution, and promoting the penetration of the polyhydrazide compound into the paint film. Examples of such organic solvents include a glycol type solvents represented by the following general formula (4), and an alcohol type solvent represented by the following general formula (5). General Formula (4) is as follows:

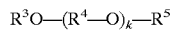

In the above formula, $R^3$ represents a saturated hydrocarbon group having 1 through 8 carbon atoms, $R^4$ represents a divalent saturated hydrocarbon group having 2 through 5 carbon atoms, $R^5$ represents hydrogen atom, an alkyl group or an acyl group having 1 through 4 carbon atoms, and k represents 1 through 4. General formula (5) is as follows:

In the above formula, $R^6$ represents a saturated hydrocarbon residue having 1 through 8 carbon atoms.

Specific examples of the above-mentioned organic solvent include glycol type solvents which is shown by the general formula (4) such as ethylene glycol monomethyl ether, ethylene glycol monoethyl ether, ethylene glycol monopropyl ether, ethylene glycol monobutyl ether, diethylene glycol monobutyl ether, diethylene glycol monopropyl ether, diethylene glycol monoethyl ether, propylene glycol monoethyl ether, ethylene glycol dimethyl ether, 3-methyl-3-methoxybutyl, ethylene glycol monoethyl ether acetate, and propylene glycol monomethyl ether acetate; alcohol type solvents shown by the general formula (5) such as methanol, ethanol, n-propanol, isopropanol, n-butanol, isobutanol, benzyl alcohol and cyclohexanol; dioxane, tetrahydrafuran, N-methylpyrrolidone, and ethylene glycol. These may be used alone or as a mixture of 2 kinds or more.

Among these organic solvents, use of an amphiphilic solvent is preferred for the purpose of promoting the penetration of the polyhydrazide compound into the film. Examples of amphiphilic solvent include organic solvents which is represented by the general formula $R^7OR^8OH$ (where $R^7$ represents a saturated hydrocarbon group having 2 through 5 carbon atoms, and $R^8$ represents a divalent saturated hydrocarbon group having 2 through 5 carbon atoms), which limits the general formula (4) additionally. Examples represented by the above general formula include ethylene glycol monoethyl ether, ethylene glycol monopropyl ether, ethylene glycol monobutyl ether, diethylene glycol monobutyl ether, diethylene glycol monopropyl ether, diethylene glycol monoethyl ether, propylene glycol monoethyl ether and 3-methyl-3-methoxybutanol.

The blending amount of the organic solvent varies significantly depending on the type of solvent and other factors, and is preferably in a range where the paint film does not elute, the solvent penetrates sufficiently, and no fire hazard exists; in general, suitable amount of the organic solvent is not more than 60% by weight, preferably 3 to 50% by weight and more preferably 5 to 25% by weight in the aqueous solution containing the polyhydrazide compound. The amount exceeding 60% by weight makes the paint film dissolved easily into the aqueous solution.

The acidic component mentioned above that may be blended into the aqueous solution containing the polyhydrazide compound is blended for the purpose of promoting the reaction of the carbonyl group in the paint film with the polyhydrazide compound by making the aqueous solution acidic and for the purpose of improving the solubility of polyhydrazide compound in the aqueous solution. When the resin of the paint has an anionic group and the paint film is acidic, the acidic component might not necessarily be blended. However, when the paint film is neutral or basic, blend of the acidic component is desirable for the purpose of making the reaction time short, of the carbonyl group in the paint film and the polyhydrazide compound, and for the purpose of preventing swelling and dissolution of the paint film by contact with the aqueous solution.

Examples of the acidic component mentioned above include organic acids such as formic acid, acetic acid, propionic acid, acrylic acid, itaconic acid, maleic acid, fumaric acid, and benzene sulfonic acid; acidic compounds containing phosphorous such as phosphoric acids including phosphoric acid, phosphorous acid, hypophosphorous acid, orthophosphoric acid, pyrophosphoric acid, tripolyphosphoric acid, and metaphosphoric acid, monomethyl phosphate, monoethyl phosphate, mono n-butyl phosphate, diethyl phosphate, dimethyl phosphate, and ethyl ester of phosphorous acid and other esters of phosphoric acids; and inorganic acids such as hydrochloric acid, sulfonic acid, and nitric acid. These may be used in single or in a mixture of two or more. Among these acidic components, acidic compounds containing phosphorous such as phosphoric acids are preferable in particular, since they do not corrode the material to be coated, not color the paint film, and not deteriorate the adhesiveness of the paint film. The blending amount of the acidic component varies depending on the acidity and basicity of the paint film and other factors, and is generally suitable in a range of not more than 30% by weight, preferably not more than 20% by weight in the aqueous solution containing the polyhydrazide compound. The amount exceeding 30% by weight might cause corrosion of the material to be coated.

The organic solvent and the acid that may be contained in the aqueous solution of the hydrazine compound mentioned before may be the organic solvent and the acid respectively that may be incorporated into the polyhydrazide compounds mentioned above.

Now, the steps for carrying out the present invention is explained.

The materials to be coated by the paint according to the present invention are not limited specifically and may be various kinds including metals, plastics, woods, papers, glasses, ceramics, and metals of which surface is chemically treated; and these materials whose surface has undercoat film or intermediate coat film.

Examples of the processes for coating the paint, on the mentioned material to be coated, which paint contains, as a binder, the resin mentioned above containing a carbonyl group, or the resin or resin mixture containing a carbonyl group and a carboxyl group or a group that forms a carboxyl group, include dipping, spray coating, roller coating, and brushing. When the paint is water-based, electrodeposition coating may be used as well. When electrodeposition coating is applied, anionic electrodeposition is used in the case where the resin in the paint has a carboxyl group and is anionic while cationic electrodeposition is used in the case where the resin in the paint has a cationic group such as a dialkylaminoalkyloxy carbonyl group and is cationic.

Following the coating, the uncured paint film on the material to be coated is allowed to contact vapor of the hydrazine compound, or contact a solution containing the hydrazine compound such as an aqueous solution of the hydrazine compound or a solution containing the polyhydrazide compound such as an aqueous solution of the polyhydrazide compound. By this contact, the paint film should not be dissolved, removed, or swelled excessively, hence preliminary drying (room temperature drying or forced drying) is applied prior to the contact step after the coating as required. By the drying, the solvent is removed for the cases of paint films of water-based and of organic solvent-based, and fusion of powder particles occurs in the paint film of powder coating. The paint film is made fluidized and smooth sufficiently since the curing does not take place before the contact with the hydrazine compound or polyhydrazide compound. The electrodeposition is advantageous in the possibility of omitting the dry step since the solvent content in the paint film formed is generally small.

Examples of the process of contacting the uncured paint film on the material to be coated with the solution containing the hydrazine compound or with the aqueous solution containing the polyhydrazide compound include immersing into the solution, spraying the solution, applying the solution by flowing. Among them, the immersion process is preferable in view of the uniformity in the contact with the solution, the absence of excess pressure, and the easiness of controlling the process. The contact of paint film with the solution containing the hydrazine compound or with the aqueous solution containing the polyhydrazide compound is preferably made until the hydrazine compound or polyhydrazide compound penetrates into the internal of paint film sufficiently. The period of contact time is normally 0.5 to 180 minutes although it differs depending on the acidity or basicity, concentration, species of hydrazine or polyhydrazide compound, and temperature etc. When the binder component of the uncured paint film contains a dialkylamino alkyloxy carbonyl group, this group is converted to a carboxyl group by the hydrolysis in the contact process. This hydrolysis is conveniently induced by immersing step with the aqueous solution containing the hydrazine compound.

By the contact of the uncured paint film on the material to be coated with the hydrazine or polyhydrazide compound, the hydrazine or polyhydrazide compound penetrates into the paint film and cross-linking occurs. The cross-linking is understood to occur by the reaction of carbonyl and carboxyl groups in the binder component of the uncured film with the hydrazine compound or by the reaction of carbonyl groups in the binder component of the uncured film with the polyhydrazide compound.

The reaction between a carbonyl group and a polyhydrazide compound is considered to occur by the following reaction formula.

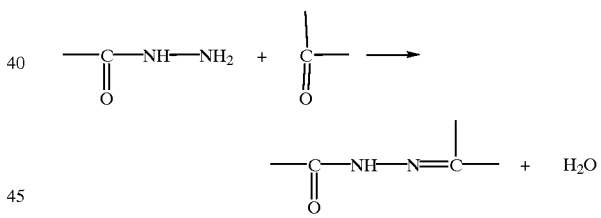

Subsequent to the contact process mentioned above, washing with water is made if necessary, the drying may be made by room temperature drying or forced drying at 15° C. through 100° C.; thereby, a cured film results. The heating may be made as required for the purpose of enhancing the degree of cross-linking by further continuing the curing reaction for example. The temperature of the heating is preferably not exceeding 100° C. from the standpoint of efficient energy use, but may exceed 100° C.; normally the heating is made at 50 to 200° C. for 1 to 40 minutes. In this way, the target cross-linking cured film is obtained.

EXAMPLES

Now, the present invention is explained in more details by way of examples.

Preparation of the Resin Containing a Carbonyl Group

Preparation Example 1

Into a flask, 270 parts by weight of propylene glycol monomethyl ether was charged, and the content was heated to 110° C. Nitrogen gas was allowed to flow into the flask to replace the air. Then, a mixture of the following monomers was allowed to drip for 1.5 hours.

| Acrylic acid | 31.5 parts by weight |
|---|---|
| Diacetone acrylamide | 270 parts by weight |
| Styrene | 180 parts by weight |
| Stearyl methacrylate | 270 parts by weight |
| n-Butyl methacrylate | 343.5 parts by weight |
| n-Butyl acrylate | 30 parts by weight |
| Isobutyl methacrylate | 225 parts by weight |
| PERBUTYL O* | 2.7 parts by weight |

(*: Polymerization initiator manufactured by Nippon Oil and Fats, Ltd.)

After the dripping completed, the flask content was kept at 110° C. for 1 hour, then 2.7 parts by weight of PERBUTYL O was added therein for 2 hours. The content was further aged at 110° C. for 2 hours. After the reaction completed, the content was cooled to 60° C. Then, 675 parts by weight of isopropanol was added therein. Subsequently, 54 parts by weight of triethylamine was added therein for neutralization. Furthermore, 1,400 parts by weight of deionized water was added for dispersion. Then, a part of isopropanol, water and propylene glycol monomethyl ether were removed by vacuum distillation. Thereby, Emulsion A was prepared. Emulsion A had a solid content of 47.0% by weight, pH 8.9, and a particle diameter of 0.11 μm.

Preparation Example 2

Emulsion B was prepared by repeating Preparation Example 1 except the blending of the monomers was changed as follows and that the amount of deionized water was changed from 1,400 parts by weight to 1,350 parts by weight. Emulsion B had a solid content of 41.0% by weight, Ph 9.1, and a particle diameter of 0.08 μm. The blending of the monomer mixture is as follows:

| Acrylic acid | 31.5 parts by weight |
|---|---|
| Diacetone acrylamide | 270 parts by weight |
| Styrene | 180 parts by weight |
| n-Butyl methacrylate | 418.5 parts by weight |
| n-Butyl acrylate | 450 parts by weight |
| PERBUTYL O | 2.7 parts by weight |

Preparation Example 3

Into a flask, 300 parts by weight of propylene glycol monomethyl ether was charged, and the content was heated to 110° C. Nitrogen gas was allowed to flow into the flask to replace the air. Then, a mixture of the following monomers was allowed to drip for 1.5 hours.

| Acrylic acid | 24 parts by weight |
|---|---|
| Diacetone acrylamide | 120 parts by weight |
| Stearyl methacrylate | 120 parts by weight |
| Styrene | 120 parts by weight |
| n-Butyl methacrylate | 96 parts by weight |
| Isobutyl methacrylate | 120 parts by weight |
| PERBUTYL O | 18 parts by weight |

After the dripping completed, the flask content was kept at 110° C. for 2 hour, and 6 parts by weight of PERBUTYL O was added therein for 2 hours. The content was further aged at 110° C. for 2 hours. After the reaction completed, the content was cooled to 60° C. Then, 34 parts by weight of triethylamine was added therein for neutralization. Furthermore, deionized water was added for dissolution. Thereby, Aqueous Resinous Solution C was prepared having a solid content of 26.3% by weight and pH 9.8.

Preparation Example 4

Into a flask, 300 parts by weight of propylene glycol monomethyl ether was charged, and the content was heated to 110° C. Nitrogen gas was allowed to flow into the flask to replace the air. Then, a mixture of the following monomers was allowed to drip for 1.5 hours.

| Acrylic acid | 20 parts by weight |
|---|---|
| Diacetone acrylamide | 120 parts by weight |
| n-Butyl acrylate | 120 parts by weight |
| Styrene | 120 parts by weight |
| n-Butyl methacrylate | 120 parts by weight |
| Isobutyl methacrylate | 120 parts by weight |
| PERBUTYL O | 18 parts by weight |

After the dripping completed, the flask content was kept at 110° C. for 2 hour, then 6 parts by weight of PERBUTYL O was added therein for 2 hours. The content was further aged at 110° C. for 2 hours. After the reaction completed, the content was cooled to 60° C. Then, 28 parts by weight of triethylamine was added therein for neutralization. Furthermore, deionized water was added for dissolution. Thereby, Aqueous Resinous Solution D having a solid content of 16.8% by weight and pH 10.4 was prepared.

Preparation Example 5

Into a flask, 300 parts by weight of deionized water, 3.46 parts by weight of NEWCOL 707SF (manufactured by Nippon Nyukazai Co., Ltd., anionic surfactant of 30% solid content) and 1 part by weight of ammonium peroxide were charged, and the content was heated to 85° C. On the other hand, a mixture of the following monomer was blended in another vessel and agitated to get a pre-emulsion.

| Acrylic acid | 5 parts by weight |
|---|---|
| Diacetone acrylamide | 194 parts by weight |
| Styrene | 265 parts by weight |
| n-Butyl methacrylate | 226 parts by weight |
| n-Butyl acrylate | 279 parts by weight |
| NEWCOL 707SF | 93.4 parts by weight |
| Ammonium peroxide | 2 parts by weight |

This pre-emulsion was allowed to drip into the flask mentioned above for 2 hours. After the dripping completed, the content was kept at 85° C. for 1 hour, then a mixture solution of 1 part by weight of ammonium peroxide and 10 parts by weight of deionized water was allowed to drip therein. After the dripping completed, aging for 2 hours was made. During the reaction, the viscosity increased. Hence, whenever the viscosity increased, deionized water was added to adjust the viscosity. The prepared Emulsion E had a solid content of 46.1% by weight and pH 2.50.

Preparation Example 6

Into a flask, 189 parts by weight of ethylene glycol monobutyl ether and 189 parts by weight of propylene glycol monomethyl ether were charged, and the content was heated to 110° C. Nitrogen gas was allowed to flow into the flask to replace the air. Then, a mixture of the following monomers was allowed to drip for 1.5 hours.

| | |
|---|---|
| Dimethylamino ethylmethacrylate | 85.5 parts by weight |
| Diacetone acrylamide | 189 parts by weight |
| Styrene | 126 parts by weight |
| Stearyl methacrylate | 155 parts by weight |
| n-Butyl methacrylate | 211.5 parts by weight |
| n-Butyl acrylate | 21 parts by weight |
| Isobutyl methacrylate | 158 parts by weight |
| Azobisisobutyronitrile | 4.7 parts by weight |

After the dripping completed, the flask content was kept at 110° C. for 2 hour, then 4.7 parts by weight of PERBUTYL O was dripped therein for 2 hours. The content was further aged at 110° C. for 2 hours. After the reaction completed, the content was cooled. Then, 26 parts by weight of acetic acid was added therein for neutralization. Furthermore, 2,446 parts by weight of deionized water was added for dissolving the product into water. Thereby, Cationic Aqueous Resinous Solution F having a solid content of 24.6% by weight and pH 4.32 was prepared.

Preparation Example 7

Into a flask, 104.4 parts by weight of tolylene diisocyanate was charged, and the content was heated to 40° C. Therein, 58.1 parts by weight of hydroxybutanone was dripped for 40 minutes. Thereby, the temperature of flask content elevated to 60° C. After the dripping completed, the content was kept at 55° C. for 2 hours. Thus, a solid adduct was obtained. Into another flask, 285 parts by weight of EPIKOTE 1001 (manufactured by Shell Chemicals Co., Ltd., epoxy resin of bisphenol A type) and 65.1 parts by weight of propylene glycol monomethyl ether acetate were charged, and the content was heated to 60° C. for dissolution. Then, 40.7 parts by weight of methylethanolamine was dripped therein for 40 minutes. After the dripping completed, the content was kept at 70° C. for 3 hours. Subsequently, additional 96 parts by weight of propylene glycol monomethyl ether acetate and 154.4 parts by weight of the solid adduct obtained as mentioned above were added therein and allowed to react at 100° C. for 3 hours. After cooling, 24 parts by weight of acetic acid and 96 parts by weight of ethylene glycol monobutyl ether were added, and then 980 parts by weight of deionized water was added therein under agitation for dissolution. Thereby, Cationic Aqueous Resinous Solution G having a solid content of 25.1% by weight was prepared.

Preparation Example 8

Into a flask, 132 parts by weight of ethylene glycol monobutyl ether and 132 parts by weight of propylene glycol monomethyl ether were charged, and the content was heated to 110° C. Nitrogen gas was allowed to flow into the flask to replace the air. Then, a mixture of the following monomers was allowed to drip for 1.5 hours.

| | |
|---|---|
| Diacetone acrylamide | 135 parts by weight |
| Stearyl methacrylate | 135 parts by weight |
| Styrene | 90 parts by weight |
| n-sutyl methacrylate | 172 parts by weight |
| n-Butyl acrylate | 15 parts by weight |
| Isobutyl methacrylate | 128 parts by weight |
| Perbutyl O | 3.3 parts by weight |

After the dripping completed, the flask content was kept at 110° C. for 2 hour, then 3.3 parts by weight of PERBUTYL O was dripped therein for 2 hours. The content was further aged at 110° C. for 2 hours. After the reaction completed, the content was cooled. Then, 411 parts by weight of ethylbenzene was added therein. Thereby, Resinous Solution H was prepared.

Preparation Example 9

Resinous Solution I was prepared by repeating Preparation Example 8 except that the blending of the monomers was changed as follows and that the amount of ethylbenzene after the cooling was changed to 464 parts by weight.

| | |
|---|---|
| Acrylic acid | 20 parts by weight |
| Acetoacetoxy ethyl methacrylate | 132 parts by weight |
| Stearyl methacrylate | 132.6 parts by weight |
| Methyl methacrylate | 104.4 parts by weight |
| n-Butyl methacrylate | 148 parts by weight |
| n-Butyl acrylate | 15 parts by weight |
| Isobutyl methacrylate | 111 parts by weight |
| PERBUTYL O | 3.3 parts by weight |

Preparation Example 10

Into a flask, 180 parts by weight of ethylene glycol monobutyl ether was charged, and the content was heated to 110° C. Nitrogen gas was allowed to flow into the flask to replace the air. Then, a mixture of the following monomers was allowed to drip for 2 hours.

| | |
|---|---|
| Dimetylaminoethyl methacrylat | 27 parts by weight |
| Diacetone acrylamide | 90 parts by weight |
| Styrene | 78 parts by weight |
| Methyl methacrylate | 79 parts by weight |
| Stearyl methacrylate | 90 parts by weight |
| n-Butyl methacrylate | 86 parts by weight |
| Azobisisobutyronitrile | 1.35 parts by weight |

After the dripping while the flask content was kept at 110° C., 1.35 parts by weight of PERBUTYL O was dripped at the time lapsing 2 hours and at the time lapsing 3 hours respectively; thereafter, the content was kept at 110° C. for additional 2 hours. Then, the content was cooled and a resinous solution was obtained thereby. The resultant resin has a number average molecular weight of about 17,000 by determination by gel permeation chromatography (GPC). To the resultant resinous solution, per 100 parts by weight of the resin solid, ethylene glycol monobutyl ether was added in an amount that its total amount be 70 parts by weight and benzyl alcohol was added in an amount that its total amount be 10 parts by weight. Furthermore, acetic acid in an amount to perform 0.5 equivalent neutralization was added therein. Then, deionized water was added until diluting the solid content to 19%. Thereby, Cationic Aqueous Resinous Solution J of pH 5.73 was prepared.

Preparation Example 11

A resinous solution was prepared by repeating Preparation Example 10 except the blending of the monomers was changed as follows. The resultant resin had a number average of about 13,000 by GPC.

| | |
|---|---|
| Dimethylamino ethylmethacrylate | 27 parts by weight |
| Diacetone acrylamide | 60 parts by weight |
| Styrene | 120 parts by weight |
| Methyl methacrylate | 120 parts by weight |
| Stearyl methacrylate | 90 parts by weight |
| n-Butyl acrylate | 33 parts by weight |
| Azobisisobutyronitrile | 1.35 parts by weight |

To the resultant resinous solution, per 100 parts by weight of the resin solid, ethylene glycol monobutyl ether was added in an amount that its total amount be 80 parts by weight and benzyl alcohol was added in an amount that its total amount be 20 parts by weight. Furthermore, acetic acid in an amount to perform 0.5 equivalent neutralization was added therein. Then, deionized water was added until diluting the solid content to 18%. Thereby, Cationic Aqueous Resinous Solution K of pH 5.10 was prepared.

Preparation Example 12

A resinous solution was prepared by repeating Preparation Example 10 except that the blending of the monomers was changed as follows and that the reaction temperature was changed from 110° C. to 120° C. The resultant resin had a number average of about 15,000 by GPC.

| Acrylic acid | 15 parts by weight |
| Diacetone acrylamide | 90 parts by weight |
| Styrene | 80 parts by weight |
| Methyl methacrylate | 80 parts by weight |
| Stearyl methacrylate | 90 parts by weight |
| n-sutyl acrylate | 95 parts by weight |
| PERBUTYL O | 9 parts by weight |

To the resultant resinous solution, per 100 parts by weight of the resin solid, ethylene glycol monobutyl ether was added in an amount that its total amount be 60 parts by weight. Furthermore, triethylamine in an amount to perform 0.6 equivalent neutralization was added therein. Then, deionized water was added until diluting the solid content to 16%. Thereby, Anionic Aqueous Resinous Solution L of pH 8.73 was prepared.

Preparation Example 13

Into a flask, 270 parts by weight of propylene glycol monomethyl ether was charged, and the content was heated to 110° C. Nitrogen gas was allowed to flow into the flask to replace the air. Then, a mixture of the following monomers was allowed to drip for 1.5 hours.

| Acrylic acid | 42.5 parts by weight |
| Diacetone acrylamide | 180 parts by weight |
| Styrene | 270 parts by weight |
| Stearyl methacrylate | 270 parts by weight |
| n-Butyl methacrylate | 270 parts by weight |
| n-sutyl acrylate | 47.5 parts by weight |
| sobutyl methacrylate | 270 parts by weight |
| PERBUTYL O | 2.7 parts by weight |

After the dripping completed, the flask content was kept at 110° C. for 1 hour, then 2.7 parts by weight of PERBUTYL O was added therein for 2 hours. The content was further aged at 110° C. for 2 hours. After the reaction completed, the content was cooled to 60° C. Then, 695 parts by weight of isopropanol was added therein. Subsequently, 59.6 parts by weight of triethylamine was added therein for neutralization. Furthermore, 1,400 parts by weight of deionized water was added for dispersion. Then, a part of isopropanol, water and propylene glycol monomethyl ether were removed by vacuum distillation. Thereby, Emulsion M was prepared. Emulsion M had a solid content of 45.6% by weight, pH 8.9, and a particle diameter of 0.09 μm.

Preparation Example 14

Into a flask, 180 parts by weight of ethylene glycol monobutyl ether was charged, and the content was heated to 120° C. Nitrogen gas was allowed to flow into the flask to replace the air. Then, a mixture of the following monomers was allowed to drip for 2 hours.

| Acrylic acid | 15 parts by weight |
| Diacetone acrylamide | 90 parts by weight |
| Styrene | 80 parts by weight |
| Methyl methacrylate | 80 parts by weight |
| Stearyl methacrylate | 90 parts by weight |
| n-Butyl acrylate | 95 parts by weight |
| PERBUTYL O | 9 parts by weight |

After the dripping completed, the flask content was kept at 120° C. for 2 hour, then 1.35 parts by weight of PERBUTYL O was added therein for 30 minutes. After elapse of another 1 hour, 1.35 parts by weight of PERBUTYL O was added therein for 30 minutes. The content was further aged at 120° C. for 2 hours. Then, the content was cooled to 60° C. Then, 84 parts by weight of ethylene glycol monobutyl ether was added, and 12.6 parts by weight of triethylamine was added therein for neutralization. Subsequently, 2,100 parts by weight of deionized water was added for dissolution. Thereby, semitransparent Aqueous Resinous Solution N was prepared, having a solid content of 16% by weight and pH 8.7.

Preparation Example 15

Into a flask, 270 parts by weight of propylene glycol monomethyl ether was charged, and the content was heated to 110° C. Nitrogen gas was allowed to flow into the flask to replace the air. Then, a mixture of the following monomers was allowed to drip for 1.5 hours.

| Diacetone acrylamide | 180 parts by weight |
| Styrene | 195 parts by weight |
| n-Butyl methacrylate | 270 parts by weight |
| n-Butyl acrylate | 360 parts by weight |
| Isobutyl methacrylate | 345 parts by weight |
| PERBUTYL O | 2.7 parts by weight |

110° C. for 2 hour, then 2.7 parts by weight of PERBUTYL O was dripped therein for 2 hours. The content was aged at 110° C. for another 2 hours. Thereby, Resinous Solution O was prepared, having a solid content of 83% by weight.

Into another flask, 180 parts by weight of propylene glycol monomethyl ether was charged, and the content was heated to 110° C. Nitrogen gas was allowed to flow into the flask to replace the air. Then, a mixture of the following monomers was allowed to drip for 2 hours.

| Acrylic acid | 45 parts by weight |
| Styrene | 110 parts by weight |
| Methyl methacrylate | 110 parts by weight |
| n-Butyl acrylate | 185 parts by weight |
| PERBUTYL O | 4.5 parts by weight |

After the dripping completed, the flask content was kept at 110° C. for 2 hours, then 1.3 parts by weight of PERBUTYL O was dripped therein for 30 minutes. After further 1 hour, 1.3 parts by weight of PERBUTYL O was dripped therein for 30 minutes. The content was aged at 110° C. for another 2 hours. Thereby, Resinous Solution P was prepared, having a solid content of 71% by weight.

The Resinous Solutions O and P thus prepared was blended so that the solid content of o/p in the weight ratio be 1/1; therein, propylene glycol monomethyl ether was added to prepare Blended Resinous Solution Q having a solid content of 40% by weight.

Preparation Example 16

Into a flask, 180 parts by weight of ethylene glycol monobutyl ether was charged, and the content was heated to 110° C. Nitrogen gas was allowed to flow into the flask to replace the air. Then, a mixture of the following monomers was allowed to drip for 1.5 hours.

| | |
|---|---|
| N,N-dimethylaminoethyl methacrylate | 27 parts by weight |
| Diacetone acrylamide | 90 parts by weight |
| Styrene | 82 parts by weight |
| Methyl methacrylate | 82 parts by weight |
| Stearyl methacrylate | 135 parts by weight |
| n-Butyl acrylate | 34 parts by weight |
| 2,2'-Azobisisobutyronitrile | 1.35 parts by weight |

After the dripping completed, the flask content was kept at 110° C. for 2 hour, then 1.35 parts by weight of PERBUTYL O was added therein. After elapse of another 1 hour, 1.35 parts by weight of PERBUTYL O was added therein. The content was further aged at 110° C. for 2 hours. Then, the content was cooled, and propylene glycol monomethyl ether was added. Thereby, Resinous Solution R was prepared, having a solid content of 40% by weight.

Example 1

Emulsion A prepared in Preparation Example 1 was diluted with deionized water so that the solid content be 25% by weight; therein, ethylene glycol monobutyl ether was added in an amount corresponding to 50 parts by weight per 100 parts by weight of the solid content of Emulsion A. In this way, anionic Electrodeposition Paint A-1 was prepared. In this electrodeposition paint, a cold rolled steel plate was immersed and anionic electrodeposition was applied thereon for 3 minutes with an applied voltage of 100 V. After the electrodeposition coating, the coated plate was pulled up, washed with water, and dried at 80° C. for 10 minutes; thereby, a coated plate having about 23 μm dry film thickness was formed. This coated plate was immersed for 30 minutes into an aqueous solution of a crosslinking agent, shown later in Table 1, at a liquid temperature of 25° C., washed with water, and dried at 80° C. for 10 minutes; thereby, a cured coated plate was prepared.

Examples 2–6 and Comparative Example 1

Example 1 was repeated except that the composition of aqueous solution of cross-linking agent and its temperature were changed as shown later in Table 1 to prepare a cured coated plate.

Example 7

Emulsion A prepared in Preparation Example 1 was diluted with deionized water so that the solid content be 25% by weight; therein, ethylene glycol monobutyl ether in an amount corresponding to 53 parts by weight and benzyl alcohol in an amount corresponding to 27 parts by weight, per 100 parts by weight of the solid content of Emulsion A were added. In this way, anionic Electrodeposition Paint A-2 was prepared. Electrodeposition Paint A-2 was used in place of Electrodeposition Paint A-1 in Example 1 to prepare a cured coated plate.

Comparative Example 2

Example 7 was repeated except that the coated plate by electrodeposition was not immersed into the aqueous solution of cross-linking agent to prepare a cured coated plate.

Examples 8–11 and Comparative Example 3

Emulsion s prepared in Preparation Example 2 was diluted with deionized water so that the solid content be 30% by weight; therein, ethylene glycol monobutyl ether was added in an amount corresponding to 50 parts by weight per 100 parts by weight of the solid content of Emulsion B. In this way, anionic Electrodeposition Paint B-1 was prepared. Electrodeposition Paint B-1 was used in place of Electrodeposition Paint A-1 in Example 1, and the aqueous solution of the cross-linking agent was as shown in Table 2. Except these, Example 1 was repeated. Thereby, a cured coated plate was obtained.

Examples 12–15 and Comparative Example 4

Aqueous Resinous Solution C prepared in Preparation Example 3 was diluted with deionized water so that the solid content be 23% by weight; therein, ethylene glycol monobutyl ether was added in an amount corresponding to 24 parts by weight and benzyl alcohol in an amount corresponding to 10 parts by weight, per 100 parts by weight of the solid content of Aqueous Resinous Solution C were added. In this way, anionic Electrodeposition Paint C-1 was prepared. Electrodeposition Paint C-1 was used in place of Electrodeposition Paint A-1 in Example 1, the aqueous solution of the cross-linking agent was as shown in Table 2, and the drying after the immersion of the cross-linking agent followed by the water washing in Example 1 was replaced by standing at room temperature for 6 hours. Except these, Example 1 was repeated. Thereby, a cured coated plate was obtained.

Example 16 and Comparative Example 5

Aqueous Resinous Solution D prepared in Preparation Example 4 was added with benzyl alcohol in an amount corresponding to 15 parts by weight per 100 parts by weight of the solid content of Aqueous Resinous Solution D. Tn this way, anionic Electrodeposition Paint D-1 was prepared. Electrodeposition Paint D-1 was used in place of Electrodeposition Paint A-1 in Example 1, the aqueous solution of the cross-linking agent was as shown in Table 3, and the drying after the aqueous solution of the cross-linking agent followed by the water washing in Example 1 was replaced by standing at room temperature for 6 hours. Except these, Example 1 was repeated. Thereby, a cured coated plate was obtained.

Example 17 and Comparative Example 6

Emulsion E prepared in Preparation Example 5 was diluted with deionized water so that the solid content be 29% by weight; therein, benzyl alcohol was added in an amount corresponding to 22 parts by weight per 100 parts by weight of the solid content of Emulsion E. In this way, anionic Electrodeposition Paint E-1 was prepared. Electrodeposition Paint E-1 was used in place of Electrodeposition Paint A-1 in Example 1, and the aqueous solution of the cross-linking agent was as shown in Table 3, and the drying after the aqueous solution of the cross-linking agent followed by the water washing in Example 1 was replaced by standing at room temperature for 6 hours. Except these, Example 1 was repeated. Thereby, a cured coated plate was obtained.

Examples 18–20 and Comparative Example 7

To 60 parts by weight of Cationic Aqueous Resinous Solution F prepared in Preparation Example 6, 30 parts by weight of deionized water, 2 parts by weight of benzyl alcohol, 3 parts by weight of ethylene glycol monobutyl ether were added to prepare cationic Electrodeposition Paint F-1. In this electrodeposition paint, a cold rolled steel plate was immersed and cationic electrodeposition was applied thereon for 3 minutes with an applied voltage of 120 V. After the electrodeposition coating, the coated plate was pulled up, washed with water, and dried at 80° C. for 30 minutes; thereby, a coated plate having about 35 μm dry film thickness was formed. This coated plate was immersed for 30 minutes into an aqueous solution of a cross-linking agent, shown later in Table 3, at a liquid temperature of 25° C., washed with water, and dried at 80° C. for 30 minutes; thereby, a cured coated plate was prepared.

Example 21 and Comparative Example 8

To 60 parts by weight of Cationic Aqueous Resinous Solution G prepared in Preparation Example 7, 40 parts by weight of deionized water was added to prepare cationic Electrodeposition Paint G-1. In this electrodeposition paint, a cold rolled steel plate was immersed and cationic electrodeposition was applied thereon for 3 minutes with an applied voltage of 60 V. After the electrodeposition coating, the coated plate was pulled up, washed with water, and dried at 80° C. for 10 minutes; thereby, a coated plate having about 20 μm dry film thickness was formed. This coated plate was immersed for 10 minutes into an aqueous solution of a cross-linking agent, shown later in Table 3, at a liquid temperature of 25° C., washed with water, and dried at 80° C. for 10 minutes; thereby, a cured coated plate was prepared. In Comparative Example 8, the immersion into agent aqueous solution of the cross-linking was not made.

Examples 22–26 and Comparative Example 9

To 50 parts by weight of Emulsion A prepared in Preparation Example 1, 10 parts by weight of deionized water was added to prepare Paint A-3. This Paint A-3 was coated on to a cold rolled steel plate by a bar coater and dried by air for 60 minutes; thereafter, further drying at 80° C. was made for 30 minutes. In this way, a coated plate having about 40 μm dry film thickness was formed. This coated plate was immersed into an aqueous solution of a cross-linking agent, shown later in Table 4, washed with water, and dried at 80° C. for 30 minutes; thereby, a cured coated plate was prepared.

Examples 27, 28 and Comparative Example 10

Emulsion E prepared in Preparation Example 5 was, as such, used as Paint E-2. This Paint E-2 was coated on to a cold rolled steel plate by a bar coater and dried at room temperature for 60 minutes; thereafter, further drying at 80° C. was made for 30 minutes. In this way, a coated plate having about 55 μm dry film thickness was formed. This coated plate was immersed into an aqueous solution of a cross-linking agent, shown later in Table 4, washed with water, and dried at 80° C. for 30 minutes; thereby, a cured coated plate was prepared.

Examples 29–31 and Comparative Example 11

Resinous Solution H prepared in Preparation Example 8 was, as such, used as Paint H-1. This Paint H-1 was coated on to a cold rolled steel plate by a bar coater and dried at room temperature for 60 minutes; thereafter, further drying at 80° C. was made for 30 minutes. In this way, a coated plate having about 34 μm dry film thickness was formed. This coated plate was immersed into an aqueous solution of a cross-linking agent, shown later in Table 5, washed with water, and dried at 80° C. for 30 minutes; thereby, a cured coated plate was prepared.

Examples 32–34 and Comparative Example 12

To 20 parts by weight of Resinous Solution T prepared in Preparation Example 9, 10 parts by weight of ethylbenzene was added for dilution. The product was used as Paint I-1. This Paint I-1 was coated on to a cold rolled steel plate by a bar coater and dried at room temperature for 60 minutes; thereafter, further drying at 80° C. was made for 30 minutes. In this way, a coated plate having about 24 μm dry film thickness was formed. This coated plate was immersed into an aqueous solution of a cross-linking agent, shown later in Table 5, washed with water, and dried at 80° C. for 30 minutes; thereby, a cured coated plate was prepared.

Example 35

Example 1 was repeated to prepare a cured coated plate except that the immersion of the coated plate into the aqueous solution of cross-linking agent was replaced by spraying the aqueous solution of cross-linking agent onto the plate to be coated at a liquid temperature of 25° C. with a contact period of 30 minutes.

Example 36

Cationic Aqueous Resinous Solution J prepared in Preparation Example 10 was, as such, used as cationic Electrodeposition Paint J-1. In this Electrodeposition Paint, a cold rolled steel plate was immersed and cationic electrodeposition was applied thereon for about 3 minutes with an applied voltage of 100 V at room temperature. After the electrodeposition coating, the coated plate was pulled up, washed with water, and dried at room temperature for 1 day; thereby, a coated plate having about 59 μm dry film thickness was formed. This coated plate was immersed for 20 minutes into an aqueous solution (a) of a cross-linking agent, shown later in Table 6, at a liquid temperature of 20° C., washed with water, and dried at 100° C. for 30 minutes; thereby, a cured coated plate was prepared.

Examples 37–41 and Comparative Examples 13, 14

Example 36 was repeated to prepare a cured coated plate except that the material to be coated which was immersed in the electrodeposition paint, the dry film thickness, the type of the cross-linking agent aqueous solution, the liquid temperature, and the period of immersion were changed as shown in Tables 6 and 7. In Comparative Examples 13 and 14, the coated plate was not immersed into the cross-linking agent aqueous solution.

Example 42

Cationic Aqueous Resinous Solution K prepared in Preparation Example 11 was, as such, used as cationic Electrodeposition Paint K-1. In this Electrodeposition Paint, a cold rolled steel plate was immersed and cationic electrodeposition was applied thereon for 3 minutes with an applied voltage of 80 V at room temperature. After the electrodeposition coating, the coated plate was pulled up, washed with water, and dried at room temperature for 1 day; thereby, a coated plate having about 32 μm dry film thickness was formed. This coated plate was immersed for 10 minutes into an aqueous solution (a) of a cross-linking agent, shown later in Table 6, at a liquid temperature of 20° C., washed with water, and dried at 100° C. for 30 minutes; thereby, a cured coated plate was prepared.

Examples 43–47 and Comparative Examples 15, 16

Example 42 was repeated to prepare a cured coated plate except that the material to be coated which was immersed in the electrodeposition paint, the dry film thickness, the type of the cross-linking agent aqueous solution, the liquid temperature, and the period of immersion were as shown in Tables 6 and 8. In Comparative Examples 15 and 16, the coated plate was not immersed into the cross-linking agent aqueous solution.

Example 48

Anionic Aqueous Resinous Solution L prepared in Preparation Example 12 was, as such, used as anionic Electrodeposition Paint L-1. In this Electrodeposition Paint, a cold rolled steel plate was immersed and anionic electrodeposition was applied thereon for about 4 minutes with an applied voltage of 100 V at room temperature. After the electrodeposition coating, the coated plate was pulled up, washed with water, and dried at room temperature for 1 day; thereby, a coated plate having about 72 $\mu$m dry film thickness was formed. This coated plate was immersed for 10 minutes into an aqueous solution (a) of a cross-linking agent, shown later in Table 6, at a liquid temperature of 20° C., washed with water, and dried at 100° C. for 30 minutes; thereby, a cured coated plate was prepared.

Examples 49–53 and Comparative Examples 17, 18

Example 48 was repeated to prepare a cured coated plate except that the material to be coated which was immersed in the electrodeposition paint, the dry film thickness, the type of the cross-linking agent aqueous solution, the liquid temperature, and the period of immersion were as shown in Tables 6 and 9. In Comparative Examples 17 and 18, the coated plate was not immersed into the cross-linking agent aqueous solution.

Examples 54–58 and Comparative Example 19

Emulsion M prepared in Preparation Example 13 was coated on a zinc phosphate treated cold rolled steel plate using a bar coater #60, and dried at room temperature for 1 day. This coated plate was contacted with a hydrazine compound under the condition shown in later Table 10 using a cross-linking agent liquid shown in Table 10, washed with water, and dried at 80° C. for 10 minutes. Thereby, a cured coated plate was prepared. Comparative Example 19 was what repeated Example 54 except the contact with the cross-linking agent liquid was not made.

Examples 59–62 and Comparative Example 20

Aqueous Resinous Solution N prepared in Preparation Example 14 was used as an anion electrodeposition bath. In this bath, a zinc phosphate treated cold rolled steel plate was immersed, and anionic electrodeposition was applied thereon for 3 minutes with an applied voltage of 100 V. Then, the coated plate was washed with water, and dried at room temperature for 1 day. This coated Plate was contacted with a hydrazine compound under the condition shown in Table 11 using a cross-linking agent liquid shown in Table 11, washed with water, and dried at 100° C. for 30 minutes. Thereby, a cured coated plate was prepared. Comparative Example 20 was what repeated Example 59 except the contact with the cross-linking agent liquid was not made.

Examples 63–66 and Comparative Example 21

Blended Resinous Solution Q prepared in Preparation Example 15 was coated on a zinc phosphate treated cold rolled steel plate using a bar coater #60, and dried at room temperature for 1 day. This coated plate was contacted with a hydrazine compound under the condition shown in later Table 12 using a cross-linking agent liquid shown in later Table 12, washed with water, and dried at 100° C. for 30 minutes. Thereby, a cured coated plate was prepared. Comparative Example 21 was what repeated Example 63 except the contact with the cross-linking agent liquid was not made.

Examples 67–68 and Comparative Example 22

Blended Resinous Solution R prepared in Preparation Example 16 was coated on a zinc phosphate treated cold rolled steel plate using a bar coater #60, and dried at room temperature for 1 day. This coated plate was contacted with a hydrazine compound under the condition shown in later Table 13 using a cross-linking agent liquid shown in Table 13, washed with water, and dried at 100° C. for 30 minutes. Thereby, a cured coated plate was prepared. Comparative Example 22 was what repeated Example 67 except the contact with the cross-linking agent liquid was not made.

Various tests have been made for the cured coated plates prepared above Examples 1 through 68 and Comparative Example 1 through 22 according to the test procedures mentioned below. Tables 1 through 5 and 7 through 13 show the results. (Note) The coating method was: anionic electrodeposition for Examples 1 through 17, 35, and 48 through 53, and Comparative Examples 1 through 6, 17 and 18; cationic electrodeposition for Examples 18 through 21, 36 through 47 and Comparative Examples 7, 8 and 13 through 16; and bar coater coating for Examples 22 through 34 and Comparative Examples 9 through 12. In Example 35 (*1), the cross-linking agent aqueous solution was sprayed for 30 minutes. In Tables 7 through 9, "NT (Not Treated)" means "an untreated cold rolled plate that has not been subjected chemical treatment" and "TT (Treated)" means "a zinc phosphate treated cold rolled steel plate" in the column of "MTC (Material to be Coated)". Experiments corresponding to Examples 36 through 53 and Comparative Example 13 through 18 were repeated, wherein the drying condition for preparing the cured coated plate was changed from 100° C. for 30 minutes to 80° C. for 10 minutes; resultant cured coated plates were subjected to the solvent resistance test. The results were same as what are shown in Tables 7 through 9 for respective Examples and Comparative Examples.

TABLE 1

| | Example | | | | | | Comparative Example 1 | Comparative Example 7 | Comparative Example 2 |
|---|---|---|---|---|---|---|---|---|---|
| | 1 | 2 | 3 | 4 | 5 | 6 | | | |
| Carbonyl group-containing resin | A | A | A | A | A | A | A | A | A |
| Carbonyl group-containing paint | A-1 | A-1 | A-1 | A-1 | A-1 | A-1 | A-1 | A-2 | A-2 |
| Film thickness ($\mu$m) | 23 | 23 | 23 | 23 | 23 | 23 | 23 | 40 | 40 |

TABLE 1-continued

|  | Example | | | | | | Comparative Example 1 | Comparative Example 7 | Comparative Example 2 |
|  | 1 | 2 | 3 | 4 | 5 | 6 | | | |
| --- | --- | --- | --- | --- | --- | --- | --- | --- | --- |
| Composition of aqueous cross-linking agent solution | | | | | | | | | |
| Deionized water | 15 | 17.5 | 15 | 15 | 15 | 15 | 22 | 15 | |
| Carbodihydrazide | 2 | 2 | 2 | 2 | 2 | | | 2 | |
| Adipic dihydrazide | | | | | | 2 | | | |
| Ethylene glycol monoethyl ether | | | | | | | | | |
| Ethylene glycol monobutyl ether | 5 | 2.5 | | | | 5 | | 5 | |
| Diethylene glycol monobutyl ether | | | 5 | | | | | | |
| t-butyl alcohol | | | | 5 | | | | | |
| 3-Methyl-3-methoxybutanol | | | | | 5 | | | | |
| Acetic acid | | | | | | | | | |
| Immersed period in aqueous cross-linking agent solution (min) | 30 | 30 | 30 | 30 | 30 | 30 | 30 | 30 | — |
| Liquid temperature of aqueous cross-linking agent solution (° C.) | 25 | 25 | 25 | 25 | 25 | 45 | 25 | 25 | — |
| Test Result | | | | | | | | | |
| Tackiness | E | E | E | G | G | G | P | E | P |
| Pencil hardness | HB | HB | F | B | B | HB | B | F | B |
| Solvent Resistance | E | E | E | G | G | G | P | E | P |
| Water Resistance | E | E | E | E | E | E | E | E | G |

TABLE 2

|  | Example | | | | Comparative Example 3 | Example | | | | Comparative Example 4 |
|  | 8 | 9 | 10 | 11 | | 12 | 13 | 14 | 15 | |
| --- | --- | --- | --- | --- | --- | --- | --- | --- | --- | --- |
| Carbonyl group-containing resin | B | B | B | B | B | C | C | C | C | C |
| Carbonyl group-containing paint | B-1 | B-1 | B-1 | B-1 | B-1 | C-1 | C-1 | C-1 | C-1 | C-1 |
| Film thickness (μm) | 32 | 32 | 32 | 32 | 32 | 15 | 15 | 15 | 15 | 15 |
| Composition of aqueous cross-linking agent solution | | | | | | | | | | |
| Deionized water | 15 | 17.5 | 15 | 15 | 22 | 15 | 17.5 | 15 | 15 | 15 |
| Carbodihydrazide | 2 | 2 | 2 | 2 | | 2 | 2 | 2 | 2 | |
| Adipic dihydrazide | | | | | | | | | | |
| Ethylene glycol monoethyl ether | | | | | | | | | | |
| Ethylene glycol monobutyl ether | 5 | 2.5 | | | | 5 | 2.5 | | | |
| Diethylene glycol monobutyl ether | | | 5 | | | | | | | |
| t-butyl alcohol | | | | | | | | | | |
| 3-Methyl-3-methoxybutanol | | | | 5 | | | | | 5 | |
| Acetic acid | | | | | | | | | | |
| Immersed period in aqueous cross-linking agent solution (min) | 30 | 30 | 30 | 30 | 30 | 30 | 30 | 30 | 30 | 30 |
| Liquid temperature of aqueous cross-linking agent solution (° C.) | 25 | 25 | 25 | 25 | 25 | 25 | 25 | 25 | 25 | 25 |
| Test Result | | | | | | | | | | |
| Tackiness | E | E | E | E | P | E | E | E | G | P |
| Pencil hardness | F | HB | F | HB | B | H | F | F | B | B |
| Solvent Resistance | E | E | E | G | P | E | E | E | G | P |
| Water Resistance | E | E | G | G | P | G | G | G | G | G |

TABLE 3

|  | Example 16 | Comparative Example 5 | Example 17 | Comparative Example 6 | Example | | | Comparative Example 7 | Example 21 | Comparative Example 8 |
|  | | | | | 18 | 19 | 20 | | | |
| --- | --- | --- | --- | --- | --- | --- | --- | --- | --- | --- |
| Carbonyl group-containing resin | D | D | E | E | F | F | F | F | G | G |
| Carbonyl group-containing paint | D-1 | D-1 | E-1 | E-1 | F-1 | F-1 | F-1 | F-1 | G-1 | G-1 |
| Film thickness (μm) | 12 | 12 | 70 | 70 | 35 | 35 | 35 | 35 | 20 | 20 |
| Composition of aqueous cross-linking agent solution | | | | | | | | | | |
| Deionized water | 17.5 | 22 | 15 | 22 | 13 | 13 | 13 | 22 | 18 | |
| Carbodihydrazide | 2 | | 2 | | 2 | 2 | | | 2 | |
| Adipic dihydrazide | | | | | | | 2 | | | |

TABLE 3-continued

|  | Example 16 | Comparative Example 5 | Example 17 | Comparative Example 6 | Example 18 | Example 19 | Example 20 | Comparative Example 7 | Example 21 | Comparative Example 8 |
|---|---|---|---|---|---|---|---|---|---|---|
| Ethylene glycol monoethyl ether |  |  |  |  |  |  |  |  |  |  |
| Ethylene glycol monobutyl ether | 2.5 |  | 5 |  | 5 |  | 5 |  |  |  |
| Diethylene glycol monobutyl ether |  |  |  |  |  |  |  |  |  |  |
| t-butyl alcohol |  |  |  |  |  |  |  |  |  |  |
| 3-Methyl-3-methoxybutanol |  |  |  |  |  | 5 |  |  |  |  |
| Acetic acid |  |  |  |  | 2 | 2 | 2 |  | 2 |  |
| Immersed period in aqueous cross-linking agent solution (min) | 30 | 30 | 30 | 30 | 15 | 30 | 15 | 15 | 10 | — |
| Liquid temperature of aqueous cross-linking agent solution (° C.) | 25 | 25 | 25 | 25 | 25 | 25 | 25 | 25 | 25 | — |
| Test Result |  |  |  |  |  |  |  |  |  |  |
| Tackiness | E | P | E | G | E | E | E | P | E | G |
| Pencil hardness | F | B | B | 3B | F | H | F | B | 2H | H |
| Solvent Resistance | E | P | E | P | E | E | E | P | G | P |
| Water Resistance | E | F | E | F | G | G | G | G | — | — |

TABLE 4

|  | Example | | | | | Comparative Example 9 | Example | | Comparative Example 10 |
|---|---|---|---|---|---|---|---|---|---|
|  | 22 | 23 | 24 | 25 | 26 |  | 27 | 28 |  |
| Carbonyl group-containing resin | A | A | A | A | A | A | E | E | E |
| Carbonyl group-containing paint | A-3 | A-3 | A-3 | A-3 | A-3 | A-3 | E-2 | E-2 | E-2 |
| Film thickness (μm) | 40 | 40 | 40 | 40 | 40 | 40 | 55 | 55 | 55 |
| Composition of aqueous cross-linking agent solution |  |  |  |  |  |  |  |  |  |
| Deionized water | 15 | 17.5 | 15 | 15 | 15 | 22 | 17.5 | 15 | 22 |
| Carbodihydrazide | 2 | 2 | 2 | 2 | 2 |  | 2 | 2 |  |
| Adipic dihydrazide |  |  |  |  |  |  |  |  |  |
| Ethylene glycol monoethyl ether |  |  |  |  |  |  |  |  |  |
| Ethylene glycol monobutyl ether | 5 | 2.5 |  |  |  |  | 2.5 |  |  |
| Diethylene glycol monobutyl ether |  |  | 5 |  |  |  |  |  |  |
| t-butyl alcohol |  |  |  | 5 |  |  |  | 5 |  |
| 3-Methyl-3-methoxybutanol |  |  |  |  | 5 |  |  |  |  |
| Acetic acid |  |  |  |  |  |  |  |  |  |
| Immersed period in aqueous cross-linking agent solution (min) | 10 | 10 | 10 | 30 | 30 | 30 | 30 | 30 | 30 |
| Liquid temperature of aqueous cross-linking agent solution (° C.) | 25 | 25 | 25 | 25 | 25 | 25 | 25 | 25 | 25 |
| Test Result |  |  |  |  |  |  |  |  |  |
| Tackiness | E | E | E | G | G | P | E | E | P |
| Pencil hardness | F | H | F | HB | HB | 2B | H | F | HB |
| Solvent Resistance | E | E | E | G | G | P | E | G | P |
| Water Resistance | E | E | E | E | E | E | G | G | F |

TABLE 5

|  | Example | | | Comparative Example 11 | Example | | | Comparative Example 12 | Example 35 |
|---|---|---|---|---|---|---|---|---|---|
|  | 29 | 30 | 31 |  | 32 | 33 | 34 |  |  |
| Carbonyl group-containing resin | H | H | H | H | I | I | I | I | A |
| Carbonyl group-containing paint | H-1 | H-1 | H-1 | H-1 | I-1 | I-1 | I-1 | I-1 | A-1 |
| Film thickness (μm) | 34 | 34 | 34 | 34 | 24 | 24 | 24 | 24 | 23 |
| Composition of aqueous cross-linking agent solution |  |  |  |  |  |  |  |  |  |
| Deionized water | 13 | 13 | 13 | 22 | 13 |  | 13 | 22 | 15 |
| Carbodihydrazide | 2 | 2 |  |  | 2 | 2 |  |  | 2 |
| Adipic dihydrazide |  |  | 2 |  |  |  | 2 |  |  |
| Ethylene glycol monoethyl ether |  |  |  |  |  |  |  |  |  |
| Ethylene glycol monobutyl ether | 5 |  | 5 |  | 5 | 2.5 | 5 |  | 5 |
| Diethylene glycol monobutyl ether |  |  |  |  |  |  |  |  |  |
| t-butyl alcohol |  |  |  |  |  |  |  |  |  |
| 3-Methyl-3-methoxybutanol |  | 5 |  |  |  |  |  |  |  |
| Acetic acid | 2 | 2 | 2 |  | 2 |  | 2 |  |  |

TABLE 5-continued

|  | Example | | | Comparative | Example | | | Comparative | |
| --- | --- | --- | --- | --- | --- | --- | --- | --- | --- |
|  | 29 | 30 | 31 | Example 11 | 32 | 33 | 34 | Example 12 | Example 35 |
| 0.1N HCl aq |  |  |  |  |  | 15 |  |  |  |
| Immersed period in aqueous cross-linking agent solution (min) | 10 | 30 | 30 | 30 | 30 | 30 | 30 | 30 | *1 |
| Liquid temperature of aqueous cross-linking agent solution (° C.) | 25 | 25 | 25 | 25 | 25 | 45 | 25 | 25 | 25 |
| Test Result |  |  |  |  |  |  |  |  |  |
| Tackiness | E | E | E | P | E | G | E | P | E |
| Pencil hardness | F | HB | HB | B | F | F | HB | HB | HB |
| Solvent Resistance | E | G | G | P | E | G | E | P | E |
| Water Resistance | E | E | E | E | E | E | E | E | E |

TABLE 6

| Type of cross-linking agent aqueous solution | (a) | (b) | (c) |
| --- | --- | --- | --- |
| Blend ratio (Parts by weight) |  |  |  |
| Deionized water | 80 | 83 | 90 |
| Carbodihydrazide | 13 | 13 | 13 |
| Ethylene glycol monobutyl ether | 26 | 26 | 0 |
| 3-Methyl-3-methoxybutanol | 13 | 13 | 39 |
| Phosphoric acid | 4 |  | 4 |
| Phosphorous acid |  | 4.5 |  |
| pH | 4.9 | 4.6 | 4.6 |

TABLE 7

|  | Example | | | | | | Comparative | Comparative |
| --- | --- | --- | --- | --- | --- | --- | --- | --- |
|  | 36 | 37 | 38 | 39 | 40 | 41 | Example 13 | Example 14 |
| Carbonyl group-containing resin | J | J | J | J | J | J | J | J |
| Carbonyl group-containing paint | J-1 | J-1 | J-1 | J-1 | J-1 | J-1 | J-1 | J-1 |
| Material to be coated | NT | TT | NT | TT | NT | TT | NT | TT |
| Film thickness (μm) | 59 | 66 | 72 | 68 | 75 | 56 | 65 | 60 |
| Type of cross-linking agent aqueous solution | a | a | b | b | c | c | — | — |
| Liquid temperature of cross-linking agent aqueous solution (° C.) | 20 | 20 | 20 | 20 | 40 | 40 | — | — |
| Immersed period in aqueous cross-linking agent solution (min) | 20 | 20 | 20 | 20 | 20 | 20 | — | — |
| Test Result |  |  |  |  |  |  |  |  |
| Coloring of paint film | G | G | G | G | G | G | G | G |
| Tackiness | E | E | E | E | E | E | P | P |
| Pencil hardness | F | F | F | F | HB | HB | 2B | 2B |
| Solvent Resistance | E | E | E | E | G | E | P | P |
| Erichsen value (mm) | 7< | 7< | 7< | 7< | 7< | 7< | 7< | 7< |
| Impact resistance (cm) | 50< | 30 | 30 | 40 | 30 | 30 | 10 | 50< |
| Water Resistance | E | E | E | E | E | E | E | E |

TABLE 8

|  | Example | | | | | | Comparative | Comparative |
| --- | --- | --- | --- | --- | --- | --- | --- | --- |
|  | 42 | 43 | 44 | 45 | 46 | 47 | Example 15 | Example 16 |
| Carbonyl group-containing resin | K | K | K | K | K | K | K | K |
| Carbonyl group-containing paint | K-1 | K-1 | K-1 | K-1 | K-1 | K-1 | K-1 | K-1 |
| Material to be coated | NT | TT | NT | TT | NT | TT | NT | TT |
| Film thickness (μm) | 32 | 30 | 41 | 40 | 75 | 33 | 31 | 33 |
| Type of cross-linking agent aqueous solution | a | a | b | b | c | c | — | — |
| Liquid temperature of cross-linking agent aqueous solution (° C.) | 20 | 20 | 20 | 20 | 40 | 40 | — | — |

TABLE 8-continued

|  | Example | | | | | | Comparative Example 15 | Comparative Example 16 |
| --- | --- | --- | --- | --- | --- | --- | --- | --- |
|  | 42 | 43 | 44 | 45 | 46 | 47 | | |
| Immersed period in aqueous cross-linking agent solution (min) | 10 | 10 | 10 | 10 | 20 | 10 | — | — |
| Test Result | | | | | | | | |
| Coloring of paint film | G | G | G | G | G | G | G | G |
| Tackiness | E | E | E | E | E | E | P | P |
| Pencil hardness | H | 2H | H | 2H | HB | 2H | F | F |
| Solvent Resistance | G | G | G | G | G | G | P | P |
| Erichsen value (mm) | 7< | 7< | 7< | 7< | 7< | 7< | 7< | 7< |
| Impact resistance (cm) | 20< | 20 | 20 | 20 | 30 | 20 | 10 | 10 |
| Water Resistance | E | E | E | E | E | E | E | E |

TABLE 9

|  | Example | | | | | | Comparative Example 17 | Comparative Example 18 |
| --- | --- | --- | --- | --- | --- | --- | --- | --- |
|  | 48 | 49 | 50 | 51 | 52 | 53 | | |
| Carbonyl group-containing resin | L | L | L | L | L | L | L | L |
| Carbonyl group-containing paint | L-1 | L-1 | L-1 | L-1 | L-1 | L-1 | L-1 | L-1 |
| Material to be coated | NT | TT | NT | TT | NT | TT | NT | TT |
| Film thickness (μm) | 72 | 60 | 66 | 70 | 73 | 72 | 78 | 80 |
| Type of cross-linking agent aqueous solution | a | a | b | b | c | c | — | — |
| Liquid temperature of cross-linking agent aqueous solution (° C.) | 20 | 20 | 20 | 20 | 40 | 40 | — | — |
| Immersed period in aqueous cross-linking agent solution (min) | 10 | 10 | 10 | 10 | 5 | 5 | — | — |
| Test Result | | | | | | | | |
| Coloring of paint film | G | G | G | G | G | G | G | G |
| Tackiness | E | E | E | E | E | E | P | P |
| Pencil hardness | 2B | 2B | 2B | 2B | 2B | 2B | 2B | 3B |
| Solvent Resistance | G | G | G | E | G | G | P | P |
| Erichsen value (mm) | 7< | 7< | 7< | 7< | 7< | 7< | 7< | 7< |
| Impact resistance (cm) | 10 | 10 | 10 | 10 | 10 | 10 | 10 | 10 |
| Water Resistance | E | E | E | E | E | E | E | E |

TABLE 10

|  | Example | | | | | Comparative Example 19 |
| --- | --- | --- | --- | --- | --- | --- |
|  | 54 | 55 | 56 | 57 | 58 | |
| Type of resin | M | M | M | M | M | M |
| Type of cross-linking agent liquid | d | d | d | d | ed | — |
| Cross-linking agent temperature (° C.) | 20 | 20 | 20 | 20 | 20 | — |
| Contact step of cross-linking agent liquid | IMM | IMM | IMM | VPR | IMM | — |
| Contact period of time (min) | 5 | 10 | 30 | 30 | 30 | — |
| Film thickness (μm) | 41 | 42 | 37 | 37 | 39 | 39 |
| Coloring of paint film | G | G | G | G | G | G |
| Tackiness | E | E | E | E | E | P |
| Pencil hardness | H | H | H | H | H | B |
| Erichsen value (mm) | 7< | 7< | 7< | 7< | 7< | 7< |
| Impact resistance (cm) | 30 | 30 | 40 | 20 | 20 | 10 |
| Solvent Resistance | G | G | E | G | G | P |
| Water Resistance | E | E | E | E | E | P |

TABLE 11

|  | Example | | | | Comparative |
| --- | --- | --- | --- | --- | --- |
|  | 59 | 60 | 61 | 62 | Example 20 |
| Type of resin | N | N | N | N | N |
| Type of cross-linking agent liquid | a | a | c | c | — |
| Cross-linking agent temperature (° C.) | 20 | 20 | 20 | 20 | — |
| Contact step of cross-linking agent liquid | IMM | IMM | IMM | IMM | — |
| Contact period of time (min) | 10 | 30 | 10 | 30 | — |
| Film thickness (μm) | 53 | 53 | 40 | 57 | 42 |
| Coloring of paint film | G | G | G | G | G |
| Tackiness | G | E | F | E | P |
| Pencil hardness | HB | HB | F | HB | 2B |
| Erichsen value (mm) | 7< | 7< | 7< | 7< | 7< |
| Impact resistance (cm) | 20 | 20 | 20 | 20 | 10 |
| Solvent Resistance | G | G | G | G | P |
| Water Resistance | E | E | E | E | E |

TABLE 12

|  | Example | | | | Comparative |
| --- | --- | --- | --- | --- | --- |
|  | 63 | 64 | 65 | 66 | Example 21 |
| Type of resin | Q | Q | Q | Q | Q |
| Type of cross-linking agent liquid | a | a | c | c | — |
| Cross-linking agent temperature (° C.) | 20 | 20 | 20 | 20 | — |
| Contact step of cross-linking agent liquid | IMM | IMM | IMM | IMM | — |
| Contact period of time (min) | 10 | 30 | 10 | 30 | — |
| Film thickness (μm) | 30 | 26 | 27 | 27 | 31 |
| Coloring of paint film | G | G | G | G | G |
| Tackiness | E | E | E | E | F |
| Pencil hardness | H | H | W | H | H |
| Erichsen value (mm) | 7< | 7< | 7< | 7< | 7< |
| Impact resistance (cm) | 20 | 10 | 10 | 20 | 10 |
| Solvent Resistance | G | G | G | G | P |
| Water Resistance | E | G | E | E | E |

TABLE 13

|  | Example | | Comparative |
| --- | --- | --- | --- |
|  | 67 | 68 | Example 22 |
| Type of resin | R | R | R |
| Type of cross-linking agent liquid | a | c | — |
| Cross-linking agent temperature (° C.) | 20 | 20 | — |
| Contact step of cross-linking agent liquid | IMM | IMM | — |
| Contact period of time (min) | 30 | 30 | — |
| Film thickness (μm) | 31 | 30 | 29 |
| Coloring of paint film | G | G | G |
| Tackiness | E | G | P |
| Pencil hardness | B | B | 2B |
| Erichsen value (mm) | 7< | 7< | 7< |
| Impact resistance (cm) | 30 | 20 | 20 |
| Solvent Resistance | G | G | P |
| Water Resistance | E | E | E |

TEST PROCEDURES

Coloring of paint film: The paint film is observed and evaluated visually. Evaluation "G (Good)" is given to what develops no color.

Tackiness: The coated surface was touched by fingers. The feeling is the base of evaluating the tackiness.

E (Excellent): No tackiness feeling at all.

G (Good): Slight tackiness feeling.

F (Fair): Some tackiness feeling.

P (Poor): Substantial tackiness feeling.

Pencil Hardness: A pencil scratch test is made according to JIS K5400 8.4.2 (1990). The break of paint film is the base of evaluation.

Erichsen Value: sreaking distance method to press out the steel ball until cracking and peeling are generated on the paint film is used. The steel ball is pushed out from the back surface of the Erichsen test piece using Erichsen tester. The pushing distance until cracking or peeling occurs is measured. When no cracking or peeling occurs even with the pushing distance of 7 mm, the notation is "7<". The procedure is according to JIS K5400 8.2 (1990).

Impact Strength: A Du-Pont impact tester is used. Falling weight is 500 g. A definite roundness at top end of a shock mold is ½ inch. The coated surface is placed upper. The test was made by changing the falling height of the weight. The notation indicates the maximum height that does not damage the paint film. When no damage occurs with the height of 50 cm, the notation is "50<". The procedure is according to JIS K5400 8.3.2 (1990).

Solvent Resistance: Two drops (about 0.05 cc) of acetone are placed on the coated surface and left at room temperature. After the acetone evaporates, the coated surface is visually observed.

E (Excellent): No change (The cross-linking reaches to the surface of the material to be coated)

G (Good): Slight wrinkles (While the cross-linking does not reaches to the surface of the material to be coated, the cross-linking develops considerably internally)

F (Fair): Swelling marks remain on the whole surface (Cross-linking in the coated surface only)

P (Poor): Observable film dissolution

Water Resistance: The cured coated plate is immersed in deionized water for 12 hours. Thereafter, the coated surface condition is evaluated.

E (Excellent): No abnormality

G (Good): Slight whitening

F (Fair): Whitening on the whole surface, but no swelling

P (Poor): Whitening on the whole surface, and observable swelling

Tables 10 through 13 below, the designation for the type of cross-linking agent liquid means as follows respectively.

d: Aqueous solution containing the hydrazine hydrate in 80% concentration e: Aqueous solution containing the hydrazine hydrate in 16% concentration f: Aqueous solution consisting of 100 parts by weight of aqueous solution containing the hydrazine hydrate in 16% concentration and 8 parts by weight of acetic acid.

In Tables 10 through 13, as for the "CTS of CLAL (Contact step of cross-linking agent liquid)", the designation is as follows. "IMM (Immersion)" means "a process of immersing the coated plate into the cross-linking agent liquid." "VPR (Vapor)" means "a process in which the coated plate is placed over the cross-linking agent liquid surface at a distance of about 1 cm and the vapor of cross-linking agent liquid is applied to the coated surface."

Respective test results of Examples 59 through 68 and Comparative Examples 20 through 22 shown in Tables 11 through 13 are for the cases where the cured coated plate was made by drying at 100° C. for 30 minutes. Experiments corresponding to these Examples and Comparative Examples were repeated, wherein the drying condition for preparing the cured coated plate was changed from 100° C. for 30 minutes to 80° C. for 10 minutes; resultant cured coated plates were subjected to the solvent resistance test. The results were same as what are shown in Tables 11 through 13 for respective Examples and Comparative Examples.

According to the present invention, uncured paint film is formed at first, and the paint film is cured by allowing to contact with the curing agent hydrazine or polyhydrazide compound. Hence, the paint to be used may be of good storability for a long period; the coated surface is smooth enough since sufficient leveling is applied after the coating; furthermore, room temperature drying or low temperature forced drying up to about 100° C. is applicable for curing the paint film; and therefore, a practicable cured coated film can be formed having excellent solvent resistance and film hardness at such temperature condition.

By an electrodeposition coating of the paint according to the process of the present invention, articles of complicated shape can be coated. In addition, the following advantages are given therewith. The coating efficiency is excellent; little problems are associated with labor hygiene; the solvent content in the uncured paint film can be small; and the drying step before contacting with the aqueous solution of the cross-linking agent may be possibly omitted.

What is claimed is:

1. A process for forming a cured paint film on a surface to be painted comprising:

coating said surface with
     a paint (A) comprising, as a binder, (a) a resin containing a carbonyl group, or (b) a resin or a resin mixture containing a carbonyl group and a carboxyl group; or
     a paint (B) comprising, as a binder, a resin or a resin mixture containing a carbonyl group and a first group that forms a carboxyl group with a hydrazine compound or polyhydrazide compound, to form on said surface, an uncured paint film, which contains the carbonyl group, or the carbonyl group and the carboxyl group, or the carbonyl group and the first group that forms the carboxyl group; and curing said uncured paint film by contacting said uncured paint film with a hydrazine compound or a polyhydrazide compound whereby the hydrazine compound or the polyhydrazide compound crosslinks with the uncured paint film.

2. A process for forming a cured paint film according to claim 1, wherein the paint (A) comprises said binder resin (a) containing a carbonyl group, said binder resin (a) being a copolymer of a vinyl monomer containing a carbonyl group and another vinyl monomer.

3. A process for forming a cured paint film according to claim 1, wherein the resin or the resin mixture of the paint (A) or (B) comprises a copolymer of a vinyl monomer containing a carbonyl group and 5 through 50% by weight of an alkyl ester, having 12 through 30 carbon atoms, of acrylic acid or methacrylic acid based on the weight of total component monomers of the copolymer.

4. A process for forming a cured paint film according to claim 3, wherein the vinyl monomer containing a carbonyl group is diacetone acrylamide.

5. A process for forming a cured paint film according to claim 1, wherein the binder of paint (A) comprises a resin or a resin mixture which contains a carbonyl group and a carboxyl group, and another resin which is present in an amount of not more than 95% by weight based on the weight of the binder.

6. A process for forming a cured paint film according to claim 1, wherein the resin or the resin mixture of paint (A) or (B) comprises an epoxy resin.

7. A process for forming a cured paint film according to claim 1, wherein the resin or the resin mixture of paint (A) or (B) has a number average molecular weight of 500 through 2,000,000.

8. A process for forming a cured paint film according to claim 1, wherein said paint (A) or (B) is a water-based paint.

9. A process for forming a cured paint film according to claim 1, wherein the paint (A) and/or paint (B) is coated by electrodeposition coating.

10. A process for forming a cured paint film according to claim 1, wherein the hydrazine compound is hydrazine or hydrazine hydrate.

11. A process for forming a cured paint film according to claim 1, wherein the uncured paint film is formed from paint (A); and said contact is made by either immersing the uncured paint film in an aqueous solution containing a polyhydrazide compound or by spraying said uncured paint film with said aqueous solution containing a polyhydrazide.

12. A process for forming a cured paint film according to claim 11, wherein the polyhydrazide compound is carbodihydrazide.

13. A process for forming a cured paint film according to claim 11, wherein the aqueous solution containing the polyhydrazide compound further comprises a water-soluble organic solvent in an amount of 1 through 60 parts by weight on the basis of 100 parts by weight of the aqueous solution.

14. A process for forming a cured paint film according to claim 11, wherein the aqueous solution containing the polyhydrazide compound further comprises an acidic component in an amount not more than 30% by weight based on the weight of the aqueous solution.

15. A process for forming a cured paint film according to claim 14, wherein the acidic component contains a phosphorus atom.

16. A process for forming a cured paint film according to claim 1, wherein the curing comprises forced drying at a temperature of 15° C. to 100° C.

17. A process for forming a cured paint film according to claim 13, wherein the aqueous solution containing the polyhydrazide compound further comprises an acidic component in an amount not more than 30% by weight based on the weight of the aqueous solution.

18. A process for forming a cured paint film according to claim 17, wherein the acidic component contains a phosphorus atom.

* * * * *